April 28, 1925.

G. I. RAWSON

BOILER CLEANING

Original Filed March 7, 1921   11 Sheets-Sheet 3

INVENTOR.
GRANT I. RAWSON
BY
Thos. S. Donnelly
ATTORNEY.

April 28, 1925.

G. I. RAWSON

BOILER CLEANING

Original Filed March 7, 1921  11 Sheets-Sheet 4

INVENTOR.
GRANT I. RAWSON
BY
Thos. S. Donnelly
ATTORNEY.

April 28, 1925.

G. I. RAWSON

BOILER CLEANING

Original Filed March 7, 1921    11 Sheets-Sheet 5

April 28, 1925. 1,535,495
G. I. RAWSON
BOILER CLEANING
Original Filed March 7, 1921 11 Sheets-Sheet 7

Fig. 10

INVENTOR.
GRANT I. RAWSON
BY
Thos. S. Donnelly
ATTORNEY.

April 28, 1925.  G. I. RAWSON  1,535,495
BOILER CLEANING
Original Filed March 7, 1921   11 Sheets-Sheet 9

GRANT I RAWSON INVENTOR.

BY Thos. ... Donnelly ATTORNEY.

April 28, 1925.  1,535,495
G. I. RAWSON
BOILER CLEANING
Original Filed March 7, 1921   11 Sheets-Sheet 10

Fig. 14  Fig. 15

INVENTOR.
GRANT I. RAWSON
BY
Thos. L. Donnelly
ATTORNEY.

April 28, 1925.

G. I. RAWSON

BOILER CLEANING 1,535,495

Original Filed March 7, 1921    11 Sheets-Sheet 11

GRANT I RAWSON
                            INVENTOR.

BY Thos. S. Donnelly
                            ATTORNEY.

Patented Apr. 28, 1925.

1,535,495

UNITED STATES PATENT OFFICE.

GRANT I. RAWSON, OF DETROIT, MICHIGAN, ASSIGNOR, BY MESNE ASSIGNMENTS, TO DIAMOND POWER SPECIALTY CORPORATION, OF DETROIT, MICHIGAN, A CORPORATION OF MICHIGAN.

BOILER CLEANING.

Application filed March 7, 1921, Serial No. 450,412. Renewed August 8, 1924.

*To all whom it may concern:*

Be it known that I, GRANT I. RAWSON, a citizen of the United States, and a resident of the city of Detroit, Wayne County, Michigan, have invented a new and useful Improvement in Boiler Cleaning, of which the following is a specification.

My invention relates to a new and useful improvement in a boiler cleaner, and is designed principally for use with that class of boiler cleaners in which a cleaning fluid is discharged from a rotatable blower unit against, into or in the proximity of the tubes of the boiler.

One of the objects of the invention is the provision in a boiler cleaner of means for automatically delivering cleaning fluid to the respective blower units and rotating same.

Another object of the invention is the provision in a boiler cleaning system of an automatically operated drainage valve.

Another object is the provision in a boiler cleaning system of a plurality of boiler units automatically set into operation and controlled and means for operating and controlling the said blower units according to the speed of operation of the stoker used with such boilers.

Other objects will appear hereinafter.

The invention consists in the combination and arrangements of parts hereinafter described and claimed.

The invention will be best understood by reference to the accompanying drawings which form a part of this specification, and in which, Fig. 1. is a front elevational view of the distributing mechanism used in the invention.

Fig. 8ª. is a continuation of the upper end of Fig. 8.

Figures 8, 8A:
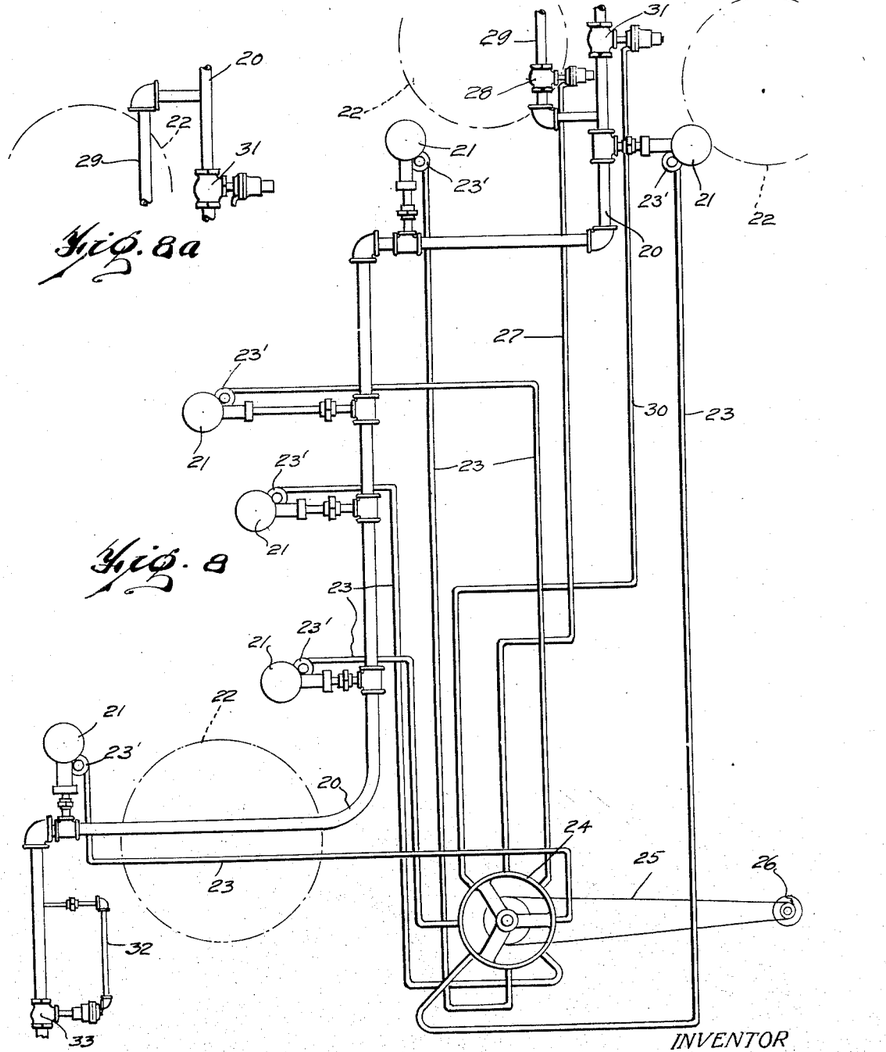
Fig. 8. is a diagrammatical view illustrating the lay-out of the invention in operation.

In boilers of the class for which this invention is adapted for use, the cleaning fluid used is generally steam and is conducted from some suitable source of supply and furnished to the various units by means of main line header 20 which communicates by suitable piping with head 21 of the blower unit as shown in Fig. 8, In Fig. 8 and 8ª, I have shown the application of the invention to a Sterling boiler, which is provided with steam and mud drums 22. The blower units are used for cleaning the soot and ashes from the tubes connecting the drums of the boiler, an operation which is well understood in the art.

Positioned adjacent to the head of each unit is a steam turbine properly connected to the unit for rotating same. This steam turbine 23' is connected by suitable piping 23 to the distributor 24 which controls the flow of steam to the turbine thereby controlling the rotation of the unit. This distributor is operated through suitable connection 25 by the stoker 26 which is used with the boiler to which the cleaning system is attached. With a system of this class where steam is used the condensation of the steam used in the blowing operation sometimes takes place in the header 20 with the result that unless this moisture is removed from the header before the steam is turned into the blower unit at the next blowing operation, the moisture will be driven against the tubes of the boiler with the consequent caking of soot upon the tubes. In order to assist in removing this moisture from the header before the steam is delivered to the blower unit, I have provided the auxiliary control valve 28 which is connected by suitable piping 27 to the distributor 24. When the time for the blowing operation arrives the distributor causes steam to be turned into the valve 28 thereby opening same to permit steam to pass from the header 20 through the by-pass 28 so as to warm up that portion of the head to which the units are connected.

Adjacent the end of the header 20 I have interposed a valve 33 which is normally open so as to permit the escape of the moisture from header 20. The steam passes through pipe 29 driving the moisture out of the header and through valve 33. After a short time, the distributor opens the valve 31 which is interposed in header 20 and allows the full pressure of steam in the head to pass to the heads of the units. In this respect it is to be noted that pipe 29 is of much smaller diameter than header 20 so that only a small portion of the full pressure of the steam in header 20 is allowed to pass through valve 28, and when the valve 31 is open the steam rushes through the header, passing through piping 32, and closes the drain valve 33. In this respect it is to be noted that the distributor is so designed as to control the entire operation.

The distributor comprises substantially a shell or stator 34, which is an annular member having a hub 36 connected by means of a radial brace or spoke 37. The entire device is suitably mounted upon base 36. (See Figs. 1, 2, 3 and 4.)

Journaled in the hub 35 is a shaft 38 upon which is rigidly mounted a hub 39 and a rotor 40 is securely fastened thereto. This rotor comprises an interrupted annular member, the interruption being sufficiently wide to afford a clearance for the pilot and main control valve, as will appear hereinafter. Securely fastened to this rotor and adjacent to the end thereof, is a cam forming member 40'.

Figure 1:
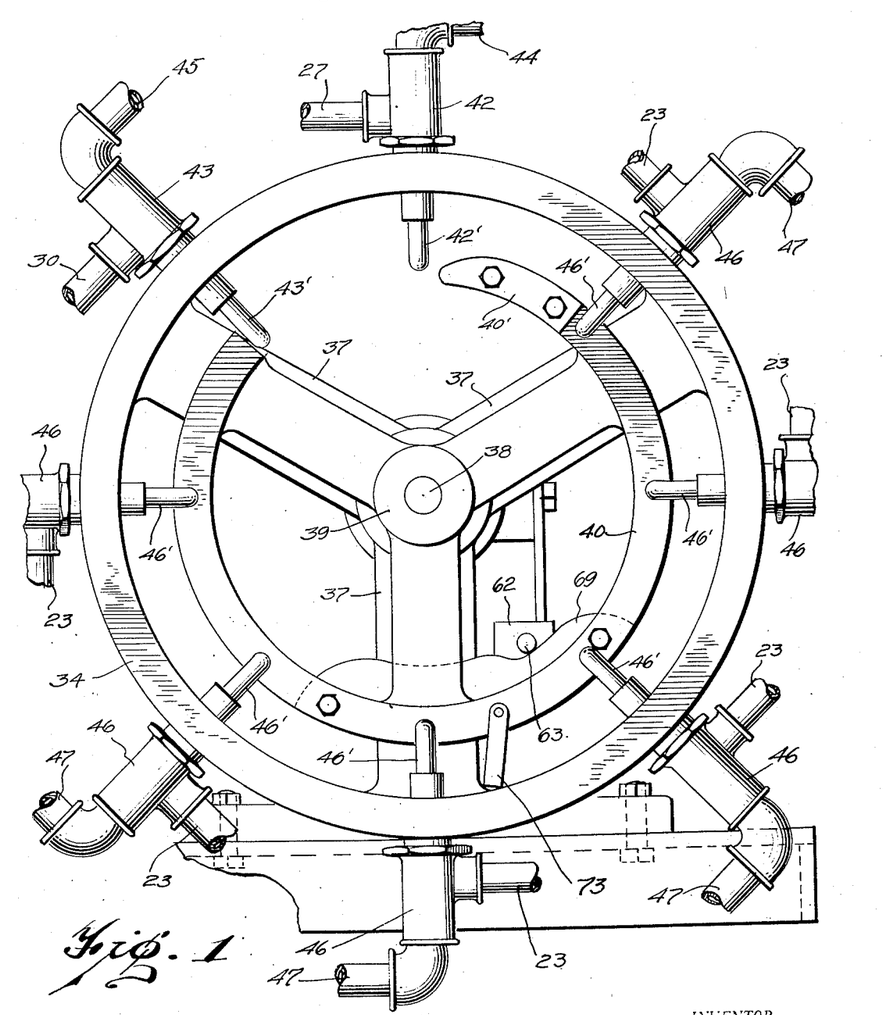

Formed in stator 34 is a pair of threaded openings 41 which are in circumferential alignment and threaded into one of these openings is a pilot valve 42 which is provided with valve stem 42' which projects radially inwardly of the stator. The valve 42 communicates by means of piping 44 with suitable means of steam supply. The valve 42, also, communicates by means of piping 27 with pilot valve 28.

Threaded into the opening formed in stator 34 so as to be in circumferential alignment with valve 42 is valve 43 which has a valve stem 43' projecting radially inwardly of the stator. The valve 43 communicates by means of suitable piping 45 with a suitable source of steam supply and by means of piping 30 with the main control valve 31, which is interposed in header 20.

Figure 2:
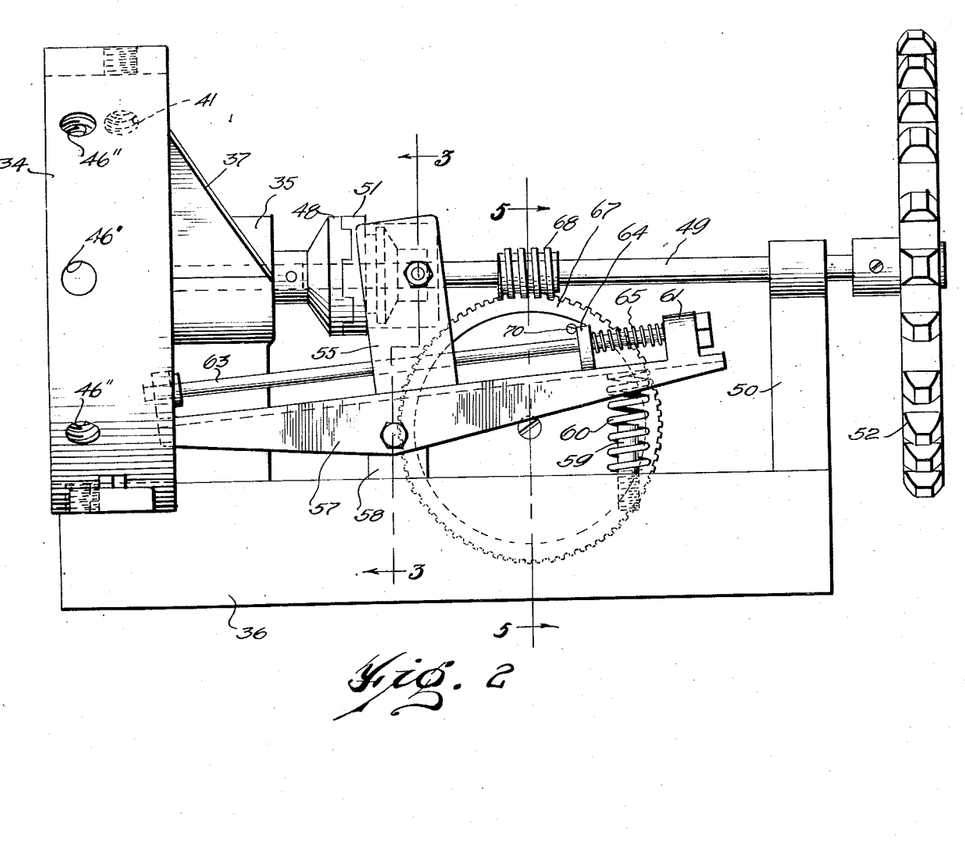
Fig. 2. is a side elevational view of the stoker operating control mechanism for the distributor.
Figure 3:
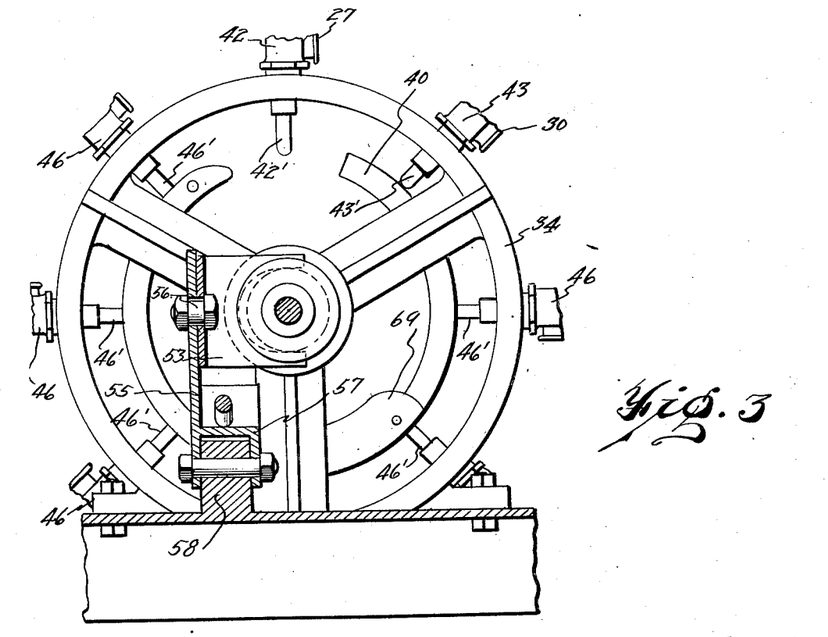
Fig. 3. is a view taken on the substantial line 3—3 of Fig. 1.
Figure 4:
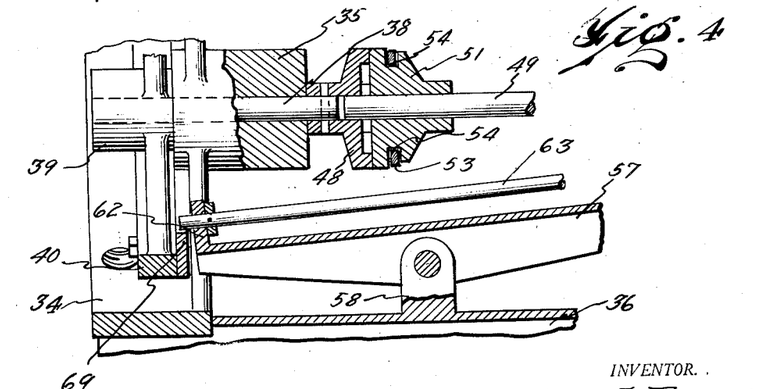
Fig. 4. is a fragmentary view showing parts in section of the rocker arm and clutch shown in Fig. 2.

As shown in Fig. 2 the stator 34 is provided with a plurality of aligned openings 46'' which are off-set from the opening 41. Into each of these openings 46'' is threaded a valve 46 which has valve stem 46' projecting radially inwardly of the stator 34. Each valve is connected by piping 47 with a suitable source of steam supply and is also connected with suitable piping 23 with the turbine used for driving its blower unit.

As shown in Fig. 2, there is rigidly mounted on shaft 38 jaw 48 of a clutch. Journaled in standard 50 which is mounted on base 36 is shaft 49 to one end of which is rigidly connected clutch jaw 51 which is designed to co-operate with jaw 48. Rigidly mounted on shaft 49 adjacent to its opposite end is sprocket wheel 52 which is connected by means of sprocket chain 25 to a sprocket wheel, which is fastened upon a rotating shaft. A yoke 53 embraces the jaw 51 in the groove or recess 54 formed therein. This yoke is connected by means of a suitable bolt 56 to an upright projection 55 formed on rocker arm 57 which is pivotally mounted upon a lug 58 formed on base 36.

Threaded into base 36 is a stud 59 embracing which is a spiral spring 60 one end of which engages base 36 and the opposite end of which engages the under surface of the rocker arm adjacent its rear-ward end.

Slidably mounted in openings formed in lugs 61 and 62 formed on the upper surface of rocker arm 57 at the opposite end thereof is a pin 63 which normally projects beyond the forward end of rocker arm 57. Rigidly mounted upon pin 63 adjacent its rearward end is a trigger 64. Embracing the pin 63 and positioned between trigger 64 and lug 61 is a spiral spring 65. Rotatably mounted on standard 66 formed on base 36 is a worm wheel 67 which meshes with worm 68 rigidly mounted on shaft 49. Mounted on rotor 40 is a cam 69 the ends of which are beveled to permit the rise of the pin 62 onto the upper surface thereof, said cam being adjusted to engage said pin upon the rotation of the rotor 40.

With the device in the position shown in Fig. 2 a rotation of the wheel 52 will cause rotation of the rotor thereby causing the rotor to engage valve stems 42', 43' and 46' for opening these valves. As the rotor proceeds on its rotation the cam 69 will engage pin 63 and cause the arm 67 to rock against the pressure of spring 60 thereby causing jaws 51 and 48 of the clutch to disengage.

Figures 5, 6, 7:
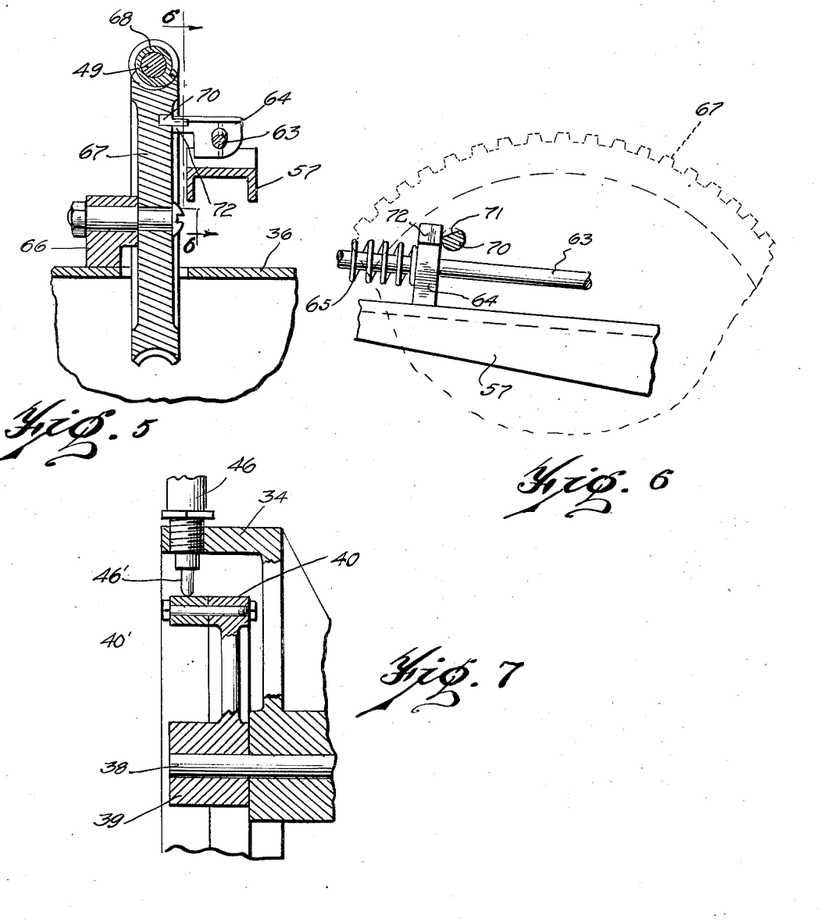
Fig. 5. is a sectional view taken on substantial line 5—5 of Fig. 2.
Fig. 6. is a fragmentary elevation view illustrating the trip used in the invention.
Fig. 7. is a fragmentary view of the auxiliary cam used in the distributing device.

With the device in position shown in Fig. 1 the time for a blowing has practically been reached, the wheel 52 will have rotated the wheel 67 to a position where a stud 70 secured in wheel 67 projecting from one side thereof will engage finger 72 of the trigger 64. As the rotation of the wheel 67 continues the pin 63 is forced rearwardly against the pressure of spring 65. The cam 69 is thereby disengaged thus allowing the jaws 51 and 48 to interlock. As shown in Fig. 6 one side 71 of stud 70 is cut away so as to present a bevel approach to finger 72. The rotation of wheel 67 is very slow in comparison to the rotation of shaft 49 and for this reason the stud 70 will not have entirely cleared the trigger 64 when the rotor has made one revolution. In order to prevent the rotor from making another revolution because of the continued engagement of the stud 70 on trigger 64 the cut away surface 71 is provided. When the arm is rocked into position shown in Fig. 2 trigger 64 is carried to such a position that the finger 72 is moved above stud 70. When the cam 69 engages pin 63 rocking the arm 57 back to its normal position as shown on Fig. 2 the finger 72 is brought down onto the top of stud 70 thus causing a rocking of pin 63 in the lugs 61 and 62 causing the tension of spring 65 one end of which is securely fastened on the lug 61, the other end of which is fastened on trigger 64. When wheel 67 has rotated sufficiently to cause the disengagement of stud 70 from the finger 72 spring 65 will again carry the finger 72 down into the path of travel of stud 70. A keeper 73 is pivotally mounted on rotor 40 serving to prevent the retrogression of rotor in response to pressure of spring 60 when the device is in position shown in Fig. 1 by engaging the inner surface of stator 34.

Figure 17:
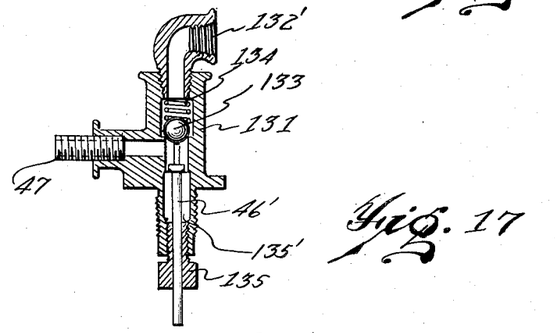
Fig. 17. is a central vertical sectional view of the valves used in the distributor.

The valves 42, 43 and 46 are similarly constructed. The valves comprise a shell or casing 131 (see Fig. 17) in one end of which is threaded an elbow 132. Positioned in this shell or casing is a ball 133 which is normally held on its seat by a spiral spring 134. The valve stem 46' projects through the stuffing box 135' and through gland 135. Upon pressing stem 46 upwards ball 133 is thereby moved from its seat, and the valve opened, as will be readily understood.

Figure 14:
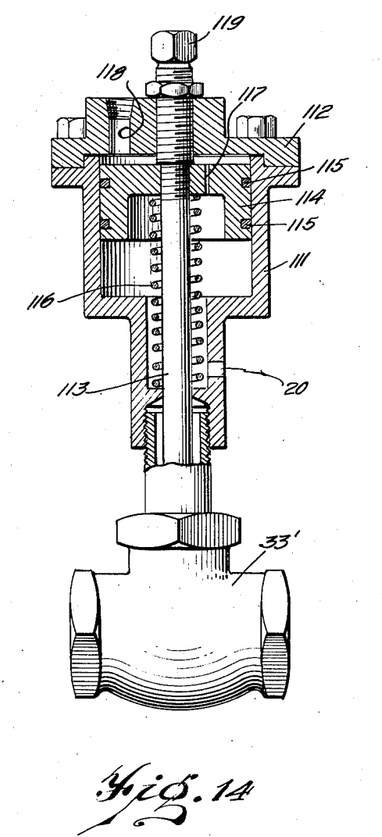
Fig. 14. is an elevational view of the drain valve showing parts in section.
Figure 15:
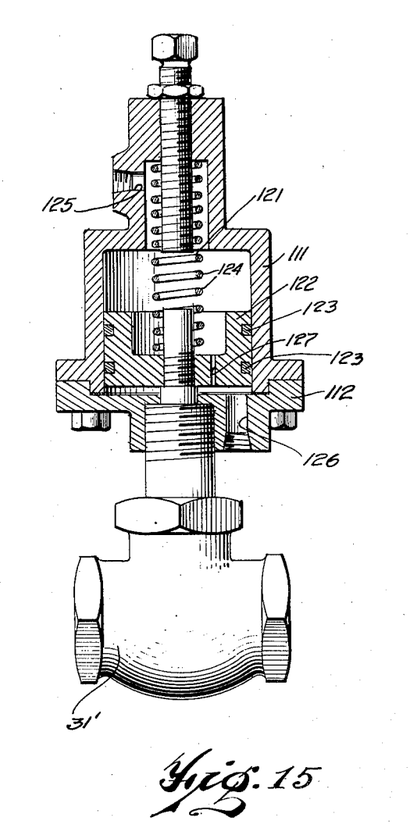
Fig. 15. is an elevational view of the main line control valve showing parts in section.

Drainage valve 33 comprises (see Fig. 14) a normally commercial valve 33' which may be opened and closed by the movement of the valve stem longitudinally therein. In order to effect the opening and closing of said valve, casing 111 is secured to member 33' into which the valve stem 113 projects. A cap 112 is provided for the casing 111 and secured thereto by suitable bolts. Secured to stem 113 adjacent its free end is piston 114 which is provided with suitable piston rings 115. Positioned upon the valve stem 113 so as to embrace the same is a spiral spring 116 one end of which engages housing 111 and the other end of which engages piston 114 so as to normally retain the valve stem completely thrust into the housing 111 thereby retaining said valve in open position. In order to close the drain valve steam is admitted into the opening 118 with sufficient pressure to overcome the pressure of the spiral spring 116. A bleed 117 is provided in the piston to facilitate the movement of said piston in the housing 111. Threaded into the center of cap 112 is a set screw 119 whereby the movement of piston 114 in housing 111 may be adjusted. An exhaust port 118 is provided in cap 112. Valves 28 and 31 are similarly constructed and embody the features of the drainage valve 33. As shown in Fig. 15, these valves comprise an ordinary commercial valve 31 which may be opened and closed by longitudinal movement of the valve stem. Secured to the case of valve 131 is a housing 111 which is provided with suitable cap 112.

The valve stem 121 projects into said housing 111 and secured thereto is a piston 132 which is provided with suitable piston rings 123. Positioned upon valve stem 121 in an embracing position is a spiral spring 124 one end of which engages piston 122 and the other end of which engages housing 111 so as to normally retain said valve in closed position. In order to open said valve steam is admitted into housing 111 through opening 126 under sufficient pressure to overcome the pressure of spiral spring 124. A bleed 127 is provided in the piston to facilitate the movement thereof. A suitable exhaust port 125 is provided in housing 111.

Figure 9:
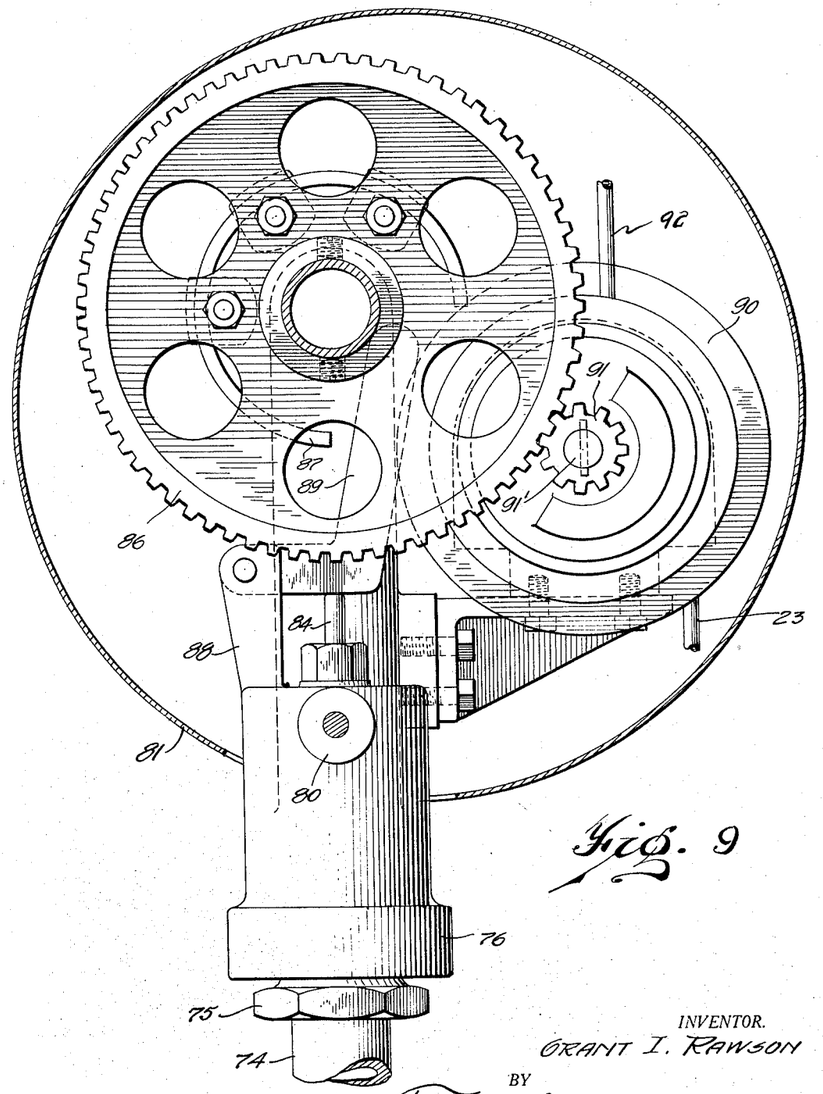
Fig. 9. is a front elevation view of the upper part of the head of the blower unit.
Figure 10:
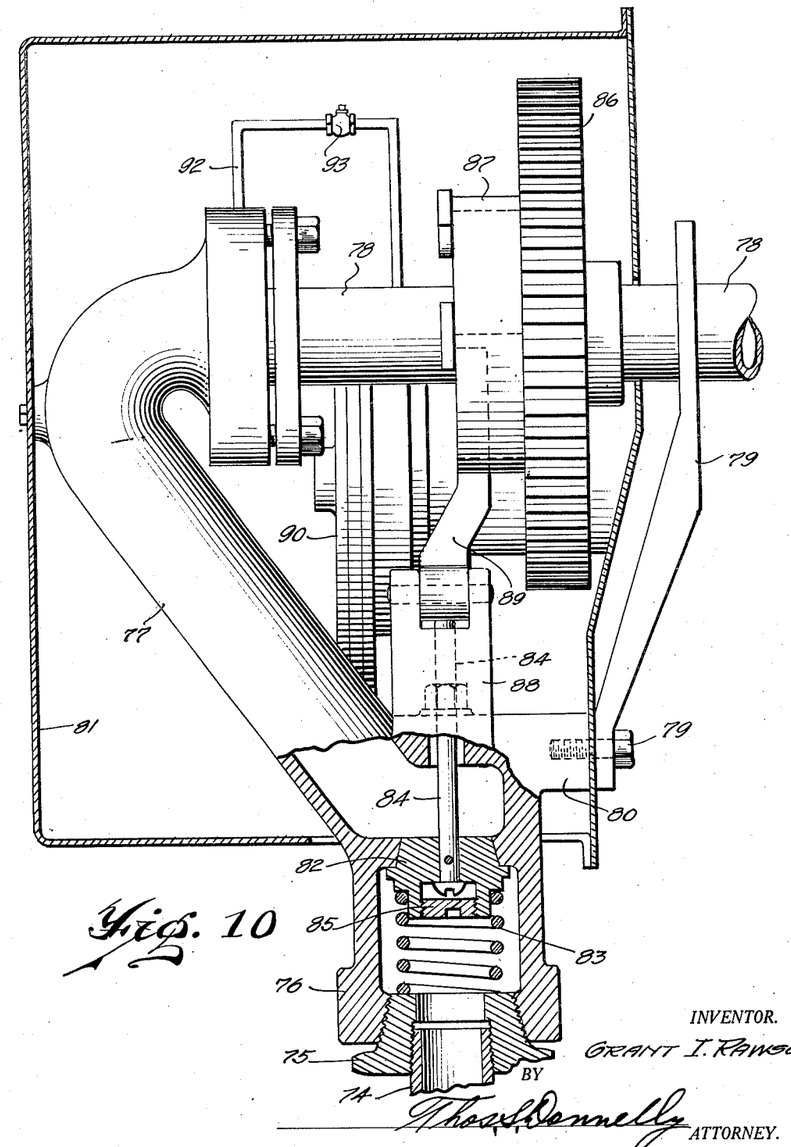
Fig. 10. is a side elevation view of the head of the blower unit showing parts in section.

As shown in Figs. 9 and 10, the header together with the mechanism which drives the unit, comprises a goose neck 77 to the lower end 76 of which there is secured a jamb nut or flange 75 in which is threaded a pipe 74 which communicates with header 20. The unit 78 is swivally connected at one end of the goose neck 77 by a flange 78 in a well known manner. Embracing, at one end, the unit 78 is a bracket 79 the opposite end of which is secured by a suitable bolt 79' to a shoulder 80 formed on the goose neck 77. The housing 81 encloses the entire head which comprises the goose neck and blower unit driving mechanism. The valve 82 is positioned in the lower end of the goose neck and serves as a closure therefor to prevent the passage of steam from pipe 74 into unit 78. This valve 82 is maintained on its seat by means of spiral spring 83 one end of which engages gland 75 and the other end of which engages the valve 82. Secured to the valve 82 is a valve stem 84 which projects upwardly externally of the goose neck. Threaded into the valve 82 is a flange 85 which serves to prevent the escape of steam around the valve stem 84. Rigidly mounted on unit 78 is a gear wheel 86 to which is fastened an interrupted circular band 87 of smaller diameter than the wheel 86. Mounted on the goose neck is a lug bearing member 88 upon which is pivotally mounted an L-shaped lever 99, adapted when moved into one position, to press the valve stem downwardly so as to open the valve 82 thereby permitting the passage of steam from the pipe 74 into the unit 78. Mounted in close proximity to the goose neck or upon a platform secured to said goose neck is a steam turbine 90 upon the shaft 91 of which there is fixedly mounted a gear wheel 91 which is adapted to mesh with gear 86. When steam is admitted into the turbine the gear wheel 86 is rotated and the segmental member 87 is brought into contact with lever 89 thereby opening valve 82. This valve is maintained in open position as long as member 87 remains in contact with member 89. When member 89 rides off member 87 the pressure of spring 83 together with pressure of steam forces the valve 82 into closed position. It is to be noted that pipe 23 which conducts the steam to turbine 90 is also connected by means of a pipe 92 to the goose neck 77. As soon as valve 82 is opened the steam will be supplied from goose neck to the turbine so that the turbine will continue to rotate the unit so long as the valve 82 is open thereby eliminating the possibility of the rotation of the unit ceasing while the valve 82 is in an open position. The delivery of steam to the turbine is controlled by the valve 46 which is positioned in the stator.

In operation, when the rocker arm 57 is caused to rock by the tripping action brought about through stud 70 and trigger 64, the rotor rotates and engages the valve stem 42' thereby opening the valve 28 (see Fig. 8) thus permitting a small amount of steam to pass through header 20 to force the condensed steam through drainage valve 33. As the rotation continues, the rotor while maintaining valve 42 in open position, opens valve 43 which permits the delivery of steam through pipe 30 thereby opening valve 31. When valve 31 is open full pressure of steam passes through header 20 causing drainage valve 33 to close, as already noticed. The rotor then brings cam 40 successively into engagement with the valve stem 46' and as each valve stem is engaged each respective valve 46 is open, the turbine for its respective blower is set into operation thereby causing steam to discharge from the blower unit.

Figure 11:
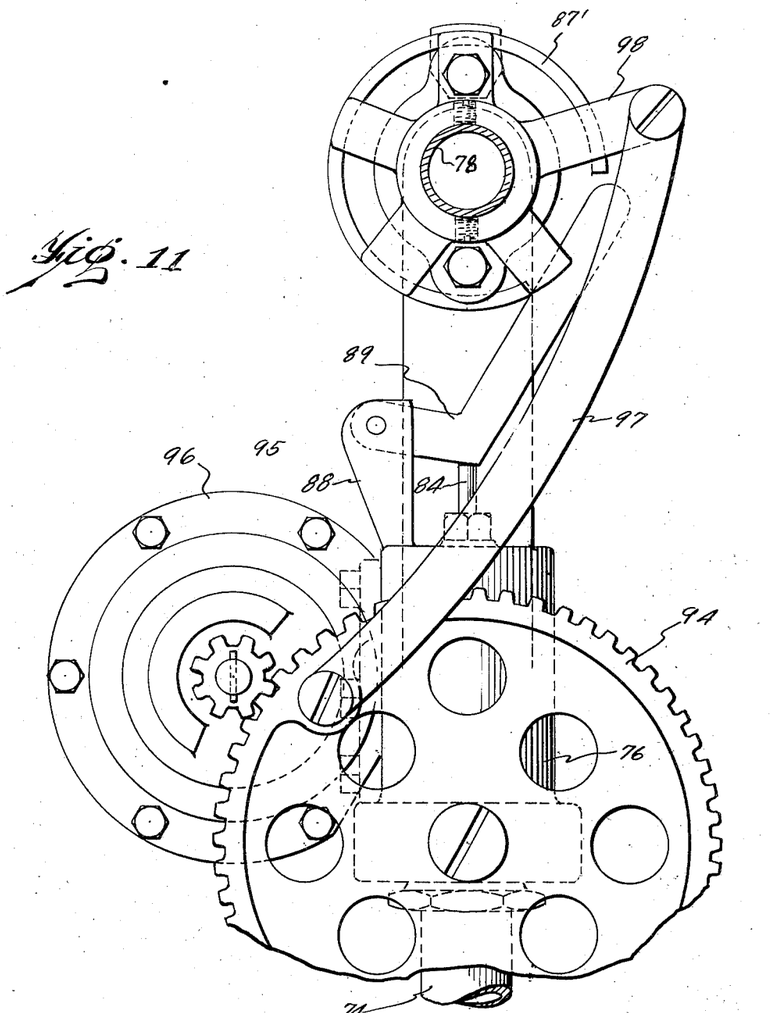
Fig. 11. is a front elevational view of the modified system of operating mechanism used in the head of the blower unit.

In Fig. 11, I have shown a modified form of unit driving mechanism. I have pivotally mounted upon the goose neck adjacent its lower end gear wheel 94 which meshes with gear 96 carried upon the shaft the steam turbine 96. Pivotally connected at one end to the gear 94 is lever 97, the opposite end which is pivotally connected to the arm 98 which is fixedly mounted upon unit 78 to which is fixedly attached a segmental band 87. Lugs 88 are provided in goose neck for pivotal mounting an L-shaped lever 89 which is adapted to open valve 82. With this construction, it is to be noted that the unit does not rotate, but merely rocks.

Figures 12, 13:
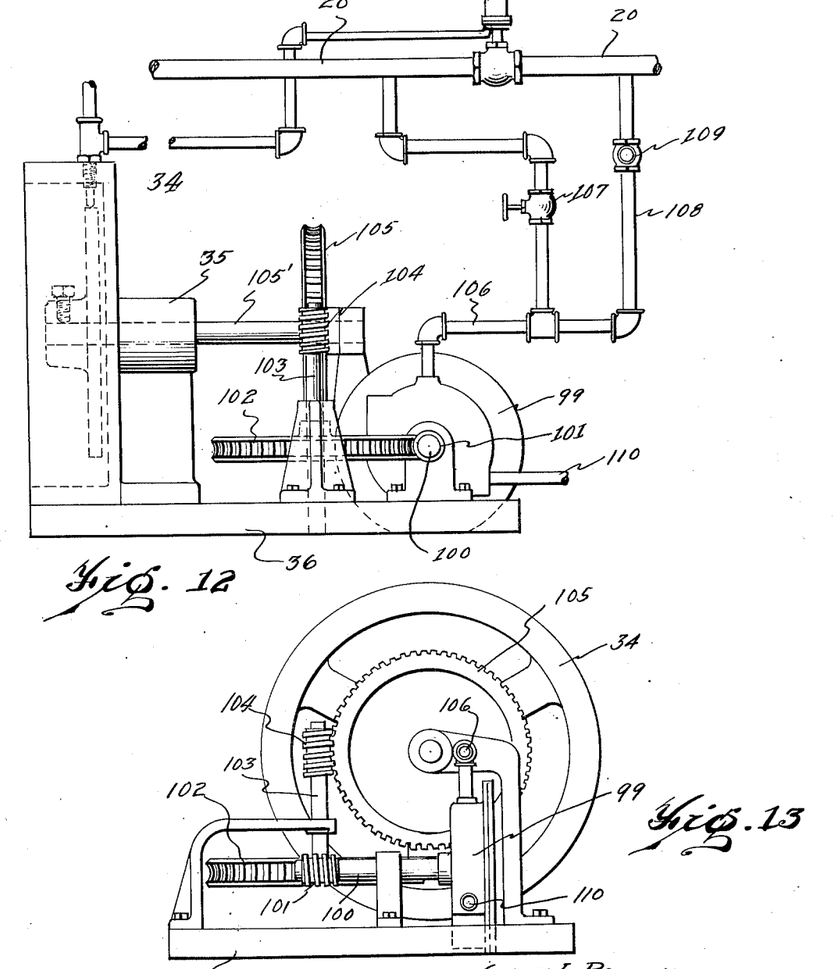
Fig. 12. is a side elevational view of the modified system of driving mechanism for the distributor.
Fig. 13. is a rear elevational view of the driving mechanism illustrated in Fig. 12.

In Fig. 12, I have shown the means of driving rotor where same is designed for use with boiler which is not equipped with a stoker. In this connection, I have provided a steam turbine 99 for driving the rotor. Secured to shaft 100 of the turbine is a worm 101 which meshes with worm wheel 102 carrying a shaft 103 upon which is mounted worm 104 which meshes with worm wheel 105 fixedly mounted on shaft 105 to which the rotor is attached fixedly. Pipe 106 conducts steam into the turbine 99 and a valve 107 serves to control the delivery of steam to the turbine. As soon as the rotor has moved a sufficient distance to open the main control valve of the header, valve 107 may be closed inasmuch as steam will then be allowed to pass through pipe 108 which communicates with header 20. A check valve 109 in the pipe 108 prevents the escape of steam through pipe 108 when valve 107 is opened for the delivery of steam to the turbine 99. Exhaust pipe 110 communicates with turbine 99.

Figure 16:
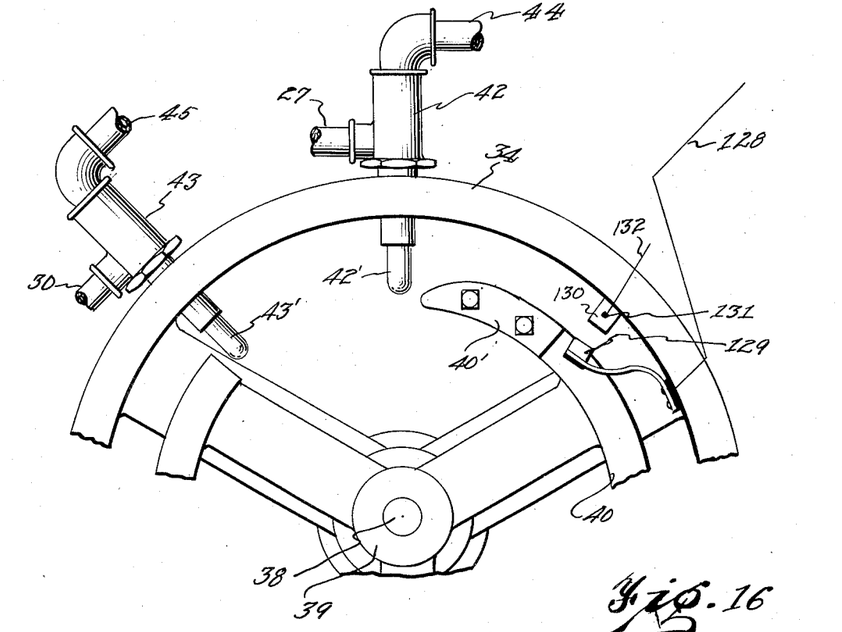
Fig. 16. is a fragmentary elevational view of a modified form of the distributor showing means for electrical operation of the blower unit.

In Figure 16, I have shown a modified form whereby stator is connected for operating an electric motor instead of steam turbine. In place of the valve 46, I have provided a system of forming electric contacts. A positive wire 128 which is connected to some suitable source of electricity is secured to the contact member 130 which is insulated from and carried by a leaf spring 129. A negative wire 132 is provided which is connected with contact member 131 which is secured to and spaced from stator 34. The cam 40' serves to move the member 130 and 131 into contact thereby starting the motor which drives the unit. When the cam 45 disengages from the lever, contact is broken.

Having thus described my invention which I claim as new and desire to secure by Letters Patent is:

1. In a boiler cleaning system comprising a plurality of blower units, a header for delivering cleaning fluid to said units; a distributor for controlling the delivery of said fluid to said header; means operable by the stoker of the boiler for controlling the delivery of fluid to said header and a drain valve in said header operable through the pressure of the cleaning fluid in said header.

2. In a boiler cleaning system comprising a plurality of blower units, a header for delivering cleaning fluid to said units; means for controlling the delivery of said fluid to said header; means for controlling the delivery of fluid to each of said units from said header; means for operating said control means of said header; means for sucessively operating said control means of said units; and means operable by the stoker of the boiler for operating said control means of said header and successively operating said control means for said units.

3. In a boiler cleaning system comprising a plurality of blower units, a header for delivering a cleaning fluid to said units; means for controlling the delivery of said fluid to said header; and means for delivering a comparatively small amount of fluid to said header for expelling moisture therefrom preliminary to operating said header control means.

4. In a boiler cleaning system comprising a plurality of blower units, a header for delivering cleaning fluid to said units; means for controlling the delivery of fluid to said header; a by-pass communicating with said header for permitting the delivery of a comparatively small amount of fluid thereto; control means in said by-pass; and means for successively operating the control means in said by-pass and in said header.

5. In a boiler cleaning system comprising a plurality of blower units, a header for delivering cleaning fluid to said units; means for controlling the delivery of fluid to said header; a by-pass communicating with said header for permitting the delivery of a comparatively small amount of fluid thereto; control means in said by-pass; and rotatable means for successively operating the control means in said by-pass and in said header.

6. In a boiler cleaning system comprising a plurality of blower units, a header for delivering a cleaning fluid to said units; means for controlling the delivery of fluid to said header; means for controlling the delivery of said fluid from said header to each of said units; a by-pass communicating with said header for permitting the delivery of a comparatively small amount of fluid to said header; control means for said by-pass; and means for successively operating said by-pass control means, said header control means and each of said unit control means.

7. In a boiler cleaning system comprising a plurality of blower units, a header for delivering a cleaning fluid to each of said units; means for controlling delivery of fluid to said header; means for controlling the delivery of said fluid from said header to said units; rotatable means for operating said control means; and means automatically operated by said rotatable means for controlling the rotation thereof.

8. In a boiler cleaning system comprising a plurality of blower units, a header for delivering a cleaning fluid to said units; means for controlling the delivery of fluid to said header; means for rotating said units; means operable by said rotating means for controlling delivery of fluid from said header to said units; a by-pass communicating with said header for permitting the delivery of a comparatively small amount of fluid thereto; control means in said by-pass; rotatable means for successively operating said by-pass control means, said header control means and said first mentioned rotating means; and automatic means for controlling the rotation of said control operating rotating means.

9. In a boiler cleaning system comprising a plurality of blower units, having means for conducting a cleaning fluid thereto, a member connecting with each of said units for controlling the delivery of fluid thereto; a rotatable member for operating successively said control members; engaging members adapted, when engaging to effect the rotation of said members; means operable by the stoker of the boiler for effecting the engaging of said members; and means operable by said rotating member for effecting the disengaging of said engaging members.

10. In a boiler cleaning system comprising a plurality of blower units, having means for conducting a cleaning fluid thereto, a member connecting with each of said units for controlling the delivery of fluid thereto; a rotatable member for operating successively said control members; engaging members adapted, when engaging to effect the rotation of said members; means operable by the stoker of the boiler for effecting the engaging of said engaging members; means operable by said rotating member for effecting the disengaging of said engaging members; and means for preventing retrogression of said rotable member upon disengagement of said engaging members.

11. In a boiler cleaning system comprising a plurality of blower units having means for delivering a cleaning fluid thereto, a member connected with each of said units for controlling the delivery of fluid thereto; a rotatable member for operating said control members successively; means for rotating said rotatable member; engageable members adapted when in engaging position to operate said rotating means; means operated by said rotating member for normally maintaining said engageable members in disengagement; means operable relatively to the speed of the stoker of the boiler for releasing said maintaining means; and means for moving the said engageable members into engagement upon releasing the said maintaining means.

12. In a boiler cleaning system comprising a plurality of blower units, a header for delivering the cleaning fluid to said units; means for controlling the delivery of said fluid to said header; means for controlling the delivery of fluid from said header to the said units; a by-pass connecting with said header for permitting the delivery of a comparatively small amount of fluid to said header; rotatable means for successively operating and maintaing in open position during a rotation thereof said by-pass control means and said header control means; means in said rotating member for successively operating during the rotation thereof after operating of said control means in said head; and means controlling the delivery of fluid from said header to each of said units.

13. In a boiler cleaning system comprising a plurality of blower units, a header for delivering a cleaning fluid to said units; means for controlling the delivery of fluid to said header; a by-pass connecting with said header for permitting the passage of a comparatively small amount of fluid into said header; control means mounted in said by-pass; means for rotating each of said units individually; means operable upon the rotation of each of said units for controlling the delivery of fluid into said units; a rotatable member; means engageable by said rotatable member upon rotation thereof for operating successively said by-pass control means and said header control means and maintaining same in open position during the rotation thereof; and means in said rotatable member for operating successively during the rotation thereof, said rotating member.

14. In a boiler cleaning system comprising a plurality of blower units, a header for delivering a cleaning fluid to said unit; means for controlling the delivery of fluid to said header; a by-pass connected with said header for permitting the passage of a comparatively small amount of fluid in said header; control means mounted in said by-pass; means for rotating each of said units individually; means operable upon the rotation of each of said units for controlling the delivery of fluid into said units; a rotatable member; means engageable by said rotatable member upon rotation thereof for operating successively said by-pass control means and said header control means and maintaining same in open position during the rotation thereof; means on said rotatable member for operating successively during the rotation thereof, said rotating member; and means for rotating said rotatable member.

15. In a boiler cleaning system comprising a plurality of blower units, a header for delivering a cleaning fluid to said units; means for controlling the delivery of fluid to said header; a by-pass connected with said header for permitting the passage of a comparatively small amount of fluid in to the same; control means mounted in said by-pass; means for rotating each of said units individually; means operable upon the rotation of each of said units for controlling the delivery of fluid into said units; a rotatable member; means engageable by said rotatable member upon rotation thereof for operating successively said by-pass control means and said header control means and maintaining same in open position during the rotation thereof; means on said rotatable member for operating successively during the rotation thereof, said rotating means; means for rotating said rotatable means; and rockable means operable by said rotatable member for controlling the rotation thereof.

In testimony whereof, I have signed the foregoing specification at Detroit, county of Wayne, Michigan this 28th day of February 1921.

GRANT I. RAWSON.